Jan. 14, 1936.    J. J. HARTL    2,027,640
POWER DEVICE
Filed Aug. 13, 1934    2 Sheets-Sheet 1

INVENTOR
JOHN J HARTL
BY
*Flournoy Corey*
ATTORNEY

Jan. 14, 1936.  J. J. HARTL  2,027,640
POWER DEVICE
Filed Aug. 13, 1934  2 Sheets-Sheet 2

INVENTOR
JOHN J HARTL
BY Flournoy Corey.
ATTORNEY

Patented Jan. 14, 1936

2,027,640

UNITED STATES PATENT OFFICE 2,027,640

POWER DEVICE

John J. Hartl, Cedar Rapids, Iowa

Application August 13, 1934, Serial No. 739,621

6 Claims. (Cl. 74—288)

This invention has reference to power devices, and has as its primary object improved means for transferring power from a prime mover to work, such as for example a lathe machine, saw machine, saw grinding machine and the like.

A still further object of the invention is to provide in a device of the character above mentioned, a plurality of power transmitting pulleys, together with improved means for selectively braking the pulleys, and for transferring a power belt from one pulley to the other.

A still further object of the invention is to provide improved means for obtaining a locked forward or reverse drive and for obtaining a half speed direct drive.

Other objects and advantages of the invention will become apparent from the following description, taken in connection with the accompanying drawings wherein:

Figure 1 is a side elevational view of the device.

Figure 4:
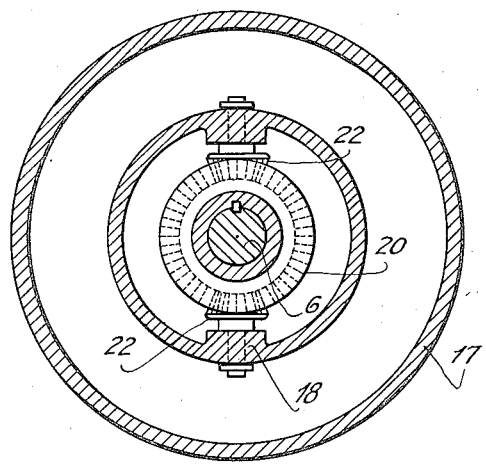

Figure 4 is a sectional elevational view through one of the pulleys showing a gear arrangement located therein.

With reference more in detail to the drawings, it will be seen that 5 designates a shaft driven from a prime mover, such as an electric motor or the like, the said shaft extending entirely through both pulleys of the device.

On the shaft 5 there is rotatably mounted a sleeve 7 to which is keyed, as at 8, the hub of a pulley wheel 9.

Associated with the pulley 9 is a well known type of internal clutch usually provided on lathes, and which, as shown, includes a pair of opposed flexible segmental shoes 10 engaged on shaft 5, and each of the shoes has pivotally connected adjacent one end thereof, as at 11, a spreader arm 12 which at that end farthest remote from the pivot 11, is equipped with an adjustable abutment designated generally by the reference character 13 which in the present instance consists merely of a bolt extending through the lever, and having nuts threadedly engaged therewith on opposite sides of the lever.

As is thought well known, the levers 12 are adapted to engage adjacent ends of the shoes 10 for spreading the shoes, whereby the latter are moved into frictional contact with the inner face of the pulley rim 9 whereby power is transmitted from the shaft 5 to the sleeve 7.

Figure 1:
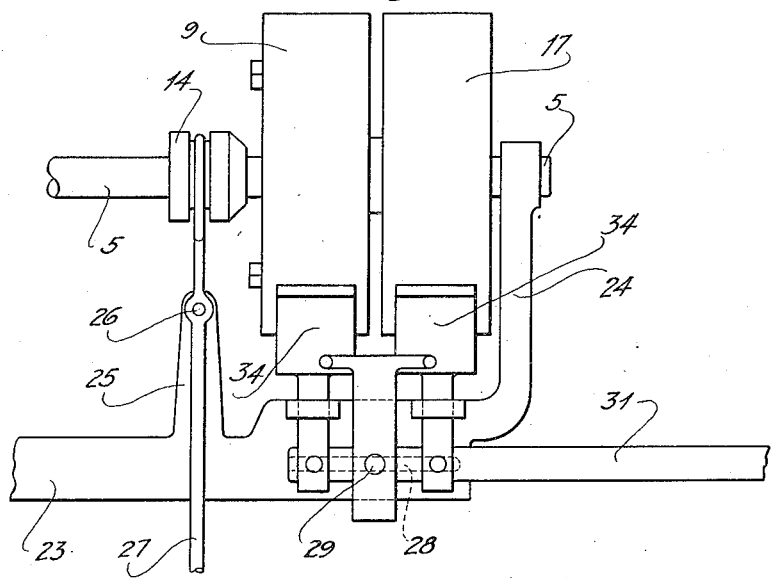
Figure 3:
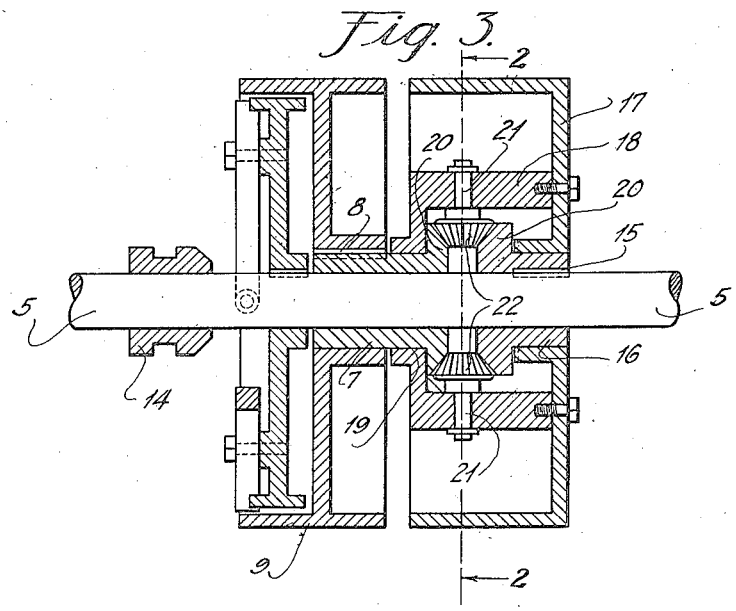
Figure 3 is a vertical longitudinal sectional elevational view through the pulleys.

Slidable on the shaft 5 is a clutch sleeve 14 which, when moved toward the right in Figures 1 and 3, will engage the abutment 13 for rocking the spreader levers 12 for engaging the pulley 9 to shaft 5 in the manner above described in detail.

Keyed to the shaft 5 as at 15 is a sleeve 16, and disposed circumjacent the sleeve 16 is a pulley 17 that is provided with an internal annular gear housing 18 having an end wall open as at 19 for receiving an end portion of the sleeve 7.

On the opposed ends of sleeves 7 and 16 are beveled gears 20, that are in mesh with oppositely disposed idler gears 22 which gears are journalled on pins 21 supported in the peripheral wall of the housing 18.

From what has been hereinbefore stated it will be apparent that when the clutch shoes 10 are in engagement with pulley 9 there is provided a locked direct drive between shaft 5 and pulley 9.

The reference numeral 23 designates a bracket having rising therefrom an arm 24 provided in its upper end with a bearing within which is journalled one end of the shaft 5. The bracket also has a standard 25 rising therefrom to which is pivoted as at 26 a control fork 27, the legs of which are received in the peripheral groove provided in the clutch sleeve 14, so that obviously by rocking the lever 27, clutch sleeve 14 is moved into and out of engagement with the abutments 13 for controlling the internal clutch.

The end portion of bracket 23 is provided with a longitudinally extending slot 28, in which is slidable a suitable bolt for pivot pin 29 which pin 29 also secures a belt shifting member 30 to a control bar 31.

Figure 2:
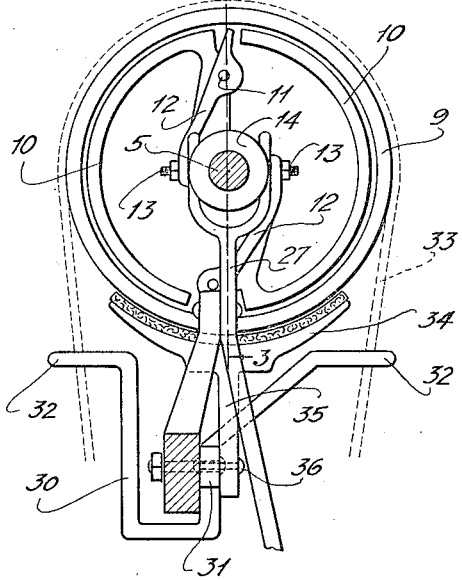
Figure 2 is a sectional elevational view looking toward one end of the device.

The belt shifting member 30 is substantially U-shaped, and at its upper open end, has the legs thereof provided with lateral extensions 32 for engagement with a belt shown in dotted lines in Figure 2 and designated generally by the reference character 33, whereby upon shifting movement of the bar 31 longitudinally relative to the bracket 23, the belt 33 may be shifted from one pulley to the other as found desirable.

For each pulley, there is also provided a substantially arcuate brake shoe 34 provided on the upper end of a shank 35 which in turn is pivotally connected to the bar 31 as at 36. Obviously, by rocking the bar 31 about the pin 29, one of the shoes 34 will be moved into frictional engagement with the pulley controlled thereby for applying a braking action to the pulley.

In actual practice then it will be seen that the belt 33 may be trained over the pulley 9 and over a power pulley of the work or machine to be driven. The motor or prime mover driving shaft 5 is then set to work. If a direct drive in the same direction and at the same speed as the shaft 5 is desired, the shaft 5 may be engaged with the pulley 9 by moving the clutch sleeve 14 into engagement with the abutments 13 to cause the spreading levers 12 to engage the blocks 10 with the pulley 9. In this condition, both pulleys are locked on the shaft 5. The pulley 9 must revolve because of its engagement by the clutch 10. The sleeve 16 is locked to the shaft 5 by the key 15 and may be considered as an integral and fixed part of the shaft. The sleeve 7 is locked to the shaft temporarily by means of the clutch shoes 10, pulley 9 and key 8. Since both bevel gears 20 are locked on the shaft 5 the pinions 22 cannot rotate on their pins 21 and consequently must revolve with the shaft, thus causing the housing 18 and pulley 17 to rotate at shaft speed. The belt 33 may be trained over either of the pulleys by means of the belt shifter 32 and a direct drive at shaft speed is secured.

If a half speed of the driven device is desired, the belt 33 is shifted to pulley 17 and the clutch shoes 10 disengaged from pulley 9. The pulley 9 is then stopped from rotation by engaging it with the left-hand brake shoe 34 (see Figure 1) by bearing downwardly on the lever 31. Since the sleeve 16 is keyed to the shaft 5 by the key 15 and the sleeve 7 is held motionless by holding the pulley 9, the pinions 22 are caused to revolve on their pins 21 and the gear housing 18 to which the pulley 17 is fixed is driven at one-half the shaft speed by reason of the connection of the housing with the pinions 22 and pins 21.

If a reverse drive at shaft speed is desired the belt is shifted to pulley 9 and the right-hand brake shoe 34 (Figure 1) is moved into engagement to stop rotation of the pulley 17 by moving the lever 31 upwardly about pivot 29. The clutch shoes 10 are, of course, disengaged from pulley 9. Since the sleeve 16 is secured to the shaft 5 and revolves with it and since the pins 21 are held motionless by the action of the right-hand brake shoe on pulley 17, the pinions 22 will revolve. As the sleeve 7 and the pulley 9, which is keyed to it, are free to rotate on shaft 5 they will be driven in the opposite direction by the pinions 22 and at the shaft speed.

In actual practice, it may be desirable to use the pulley arrangement on the driven shaft, in which case, a belt will be trained over a driving pulley and then over either of the pulleys 9 or 17. In this case, it is obvious that double driving speed may be secured on the driven shaft by engaging the pulleys as aforementioned in the manner which will give half speed when the pulleys are used for driving. The other results obtained when the pulleys are used for driving will be the same when the pulleys are driven.

Even though I have herein shown and described the preferred embodiment of the invention, it is to be understood that the same is susceptible of further changes, modifications and improvements coming within the scope of the appended claims.

Having thus described my invention, what I claim as new is:

1. A power mechanism including in combination a through shaft, a pulley rotatably mounted on and with reference to the shaft, a clutch for engaging the pulley to the shaft, a sleeve having a bevel gear thereon engaged to the pulley, a second sleeve having an oppositely disposed bevel gear secured to the shaft, a second pulley rotatably mounted on the journals formed by the two sleeves and having a pinion adapted to engage the teeth of the bevel gears, and means for selectively applying a braking action to the pulleys.

2. A power mechanism including in combination a through shaft, a pulley rotatably mounted on and with reference to the shaft, a clutch for engaging the pulley to the shaft, a sleeve having a bevel gear thereon engaged to the pulley, a second sleeve having an oppositely disposed bevel gear secured to the shaft, a second pulley rotatably mounted on the journals formed by the two sleeves and having a pinion adapted to engage the teeth of the bevel gears, and means for selectively applying a braking action to the pulleys, and additional means for shifting a belt from one pulley to the other.

3. In a power transmitting device, a through shaft, a sleeve journaled on the shaft, a pulley secured to one end of the sleeve, a clutch for detachably engaging the pulley with the shaft, a bevel gear on the other end of the sleeve from the pulley, a second, oppositely-disposed bevel gear secured to the shaft, a pulley journaled on the two sleeves and having pinions rotatably mounted on the second pulley and engaging the bevel gears, and means for selectively braking one or the other of the pulleys.

4. In a speed changing mechanism, a through shaft, a sleeve and pulley rotatably mounted on the shaft, means for engaging the sleeve and pulley to the shaft whereby the pulley may be rotated in the same direction as the shaft and at the same speed, a pinion gear on the end of the sleeve, a second pinion gear secured to the shaft and oppositely disposed with reference to the first pinion gear, a second pulley mounted for independent rotation with respect to the shaft, pinions rotatably mounted on the second pulley and engaging the bevel gears, and means for selectively braking the pulleys whereby disengaging the clutch means and braking the first pulley will cause the second pulley to rotate at one-half shaft speed and whereby when the clutch is disengaged and the second pulley is stopped from rotation, the first pulley is caused to rotate in the opposite direction to the shaft and at shaft speed.

5. In a speed changing mechanism, a drive shaft, a first pulley rotatably mounted on the drive shaft, a clutch for engaging the first pulley to the drive shaft, a second pulley, and geared means for connecting the second pulley to the drive shaft and to the first pulley whereby on disengaging the clutch and holding the second pulley, the first pulley is caused to revolve at drive shaft speed in the opposite direction and whereby on holding the first pulley the second pulley is caused to revolve at half drive shaft speed and in the same direction.

6. In a speed changing mechanism, a drive shaft, a sleeve journaled on the shaft, a pinion gear on one end of the sleeve, a first pulley secured to other end of the sleeve, a clutch for detachably engaging the pulley with the shaft whereby the pulley may be rotated in the same direction as the shaft and at the same speed, a second sleeve secured to the shaft with a pinion gear on one end of the sleeve and oppositely disposed with reference to the first pinion gear, a second pulley mounted on the two sleeves for independent rotation with respect to the shaft, pinions rotatably mounted on the second pulley for engaging the pinion gears on the sleeves whereby upon engaging the clutch with the first pulley the second pulley will be caused to rotate in the same direction and at the same speed as the drive shaft, means for selectively braking the pulleys whereby disengaging the clutch and holding the first pulley will cause the second pulley to rotate at one half speed, and whereby when the clutch is disengaged and the second pulley is stopped from rotation, the first pulley is caused to rotate in the opposite direction and at shaft speed.

JOHN J. HARTL.